(12) United States Patent
Perry

(10) Patent No.: US 9,587,436 B2
(45) Date of Patent: Mar. 7, 2017

(54) CV JOINT FOR DOWN HOLE MOTOR AND METHOD

(71) Applicant: Innovative Drilling Motors, LLC, Broussard, LA (US)

(72) Inventor: Kenny Perry, Youngsville, LA (US)

(73) Assignee: Innovative Drilling Motors, LLC, Broussard, LA (US)

( * ) Notice: Subject to any disclaimer, the term of this patent is extended or adjusted under 35 U.S.C. 154(b) by 179 days.

(21) Appl. No.: 14/291,340

(22) Filed: May 30, 2014

(65) Prior Publication Data

US 2015/0014059 A1   Jan. 15, 2015

Related U.S. Application Data

(60) Provisional application No. 61/846,665, filed on Jul. 16, 2013, provisional application No. 61/843,985, filed on Jul. 9, 2013.

(51) Int. Cl.
| | |
|---|---|
| *E21B 4/00* | (2006.01) |
| *F16D 3/10* | (2006.01) |
| *E21B 4/02* | (2006.01) |
| *F16D 3/18* | (2006.01) |

(52) U.S. Cl.
CPC ............... *E21B 4/006* (2013.01); *E21B 4/02* (2013.01); *F16D 3/185* (2013.01)

(58) Field of Classification Search
USPC ............................................ 175/57; 464/137
See application file for complete search history.

(56) References Cited

U.S. PATENT DOCUMENTS

| | | | |
|---|---|---|---|
| 3,429,143 | A | 2/1969 | Sabre |
| 3,989,114 | A | 11/1976 | Tschirky |
| 4,772,246 | A | 9/1988 | Wenzel |
| 4,932,482 | A | 6/1990 | DeLucia |
| 5,073,145 | A | 12/1991 | Ratzokwski |
| 5,078,650 | A | 1/1992 | Foote |
| 5,090,497 | A | 2/1992 | Beimgraben et al. |
| 5,267,905 | A | 12/1993 | Wenzel |

(Continued)

OTHER PUBLICATIONS

InternationalSearch Report in corresponding PCT/US2014/044323.
Written Opinion in corresponding PCT/US2014/044323.

*Primary Examiner* — Taras P Bemko
(74) *Attorney, Agent, or Firm* — Jones Walker LLP

(57) ABSTRACT

An apparatus for transmitting torque to a down hole motor in a down hole drilling assembly. The apparatus includes a center rod having a distal protuberance and a proximal protuberance, a transmission adapter having a first end connected to the down hole motor, and a transmission socket formed within a second end of the transmission adapter and configured to receive the proximal protuberance. A material bridge may be provided for the protuberances. The apparatus may also include a bearing adapter operatively connected to the center rod, with the bearing adapter having a bearing socket therein, and wherein the transmission adapter is configured to connect to an output of the down hole motor and the bearing adapter is configured to connect to an input of a bearing assembly in the down hole assembly for drilling the well. The adapters may contain external threads and the caps may contain cooperating internal threads. A method of drilling a well is also disclosed.

23 Claims, 10 Drawing Sheets

(56) References Cited

U.S. PATENT DOCUMENTS

| | | |
|---|---|---|
| 5,899,281 A | 5/1999 | Gynz-Rekowski |
| 6,173,794 B1 | 1/2001 | von Gynz-Rekowski et al. |
| 6,561,290 B2 | 5/2003 | Blair et al. |
| 6,827,160 B2 | 12/2004 | Blair et al. |
| 6,997,811 B1 | 2/2006 | Falgout, Sr. et al. |
| 7,004,843 B1 | 2/2006 | Kerstetter |
| 7,186,182 B2 | 3/2007 | Wenzel |
| 7,624,819 B1 | 12/2009 | LeBlanc et al. |
| 8,033,917 B2 | 10/2011 | Prill |
| 8,033,920 B1 | 10/2011 | Benson |
| 8,062,140 B2 | 11/2011 | Wall |
| 8,157,025 B2 | 4/2012 | Johnson |
| 2003/0111269 A1 | 6/2003 | Blair et al. |
| 2003/0181245 A1 | 9/2003 | Shaw |
| 2008/0029304 A1 | 2/2008 | LeBlanc et al. |
| 2009/0275415 A1* | 11/2009 | Prill .......................... E21B 4/02 464/152 |
| 2009/0298597 A1* | 12/2009 | Wall ........................ E21B 17/03 464/140 |
| 2011/0088952 A1 | 4/2011 | Young et al. |
| 2012/0122595 A1 | 5/2012 | Stanomir |

\* cited by examiner

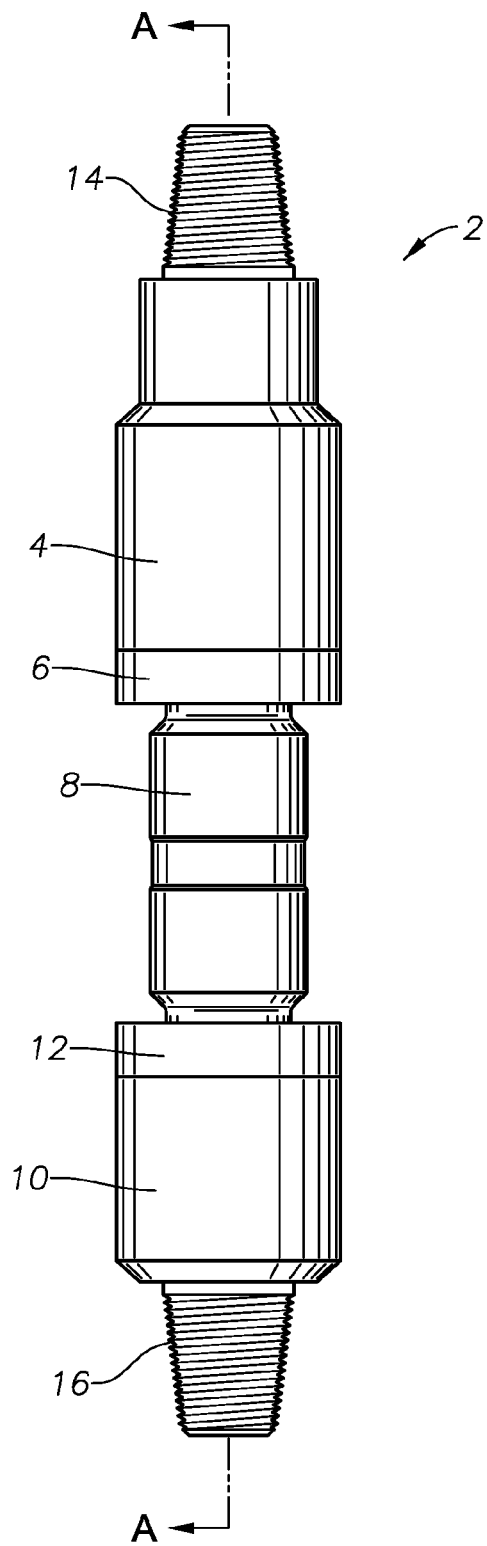
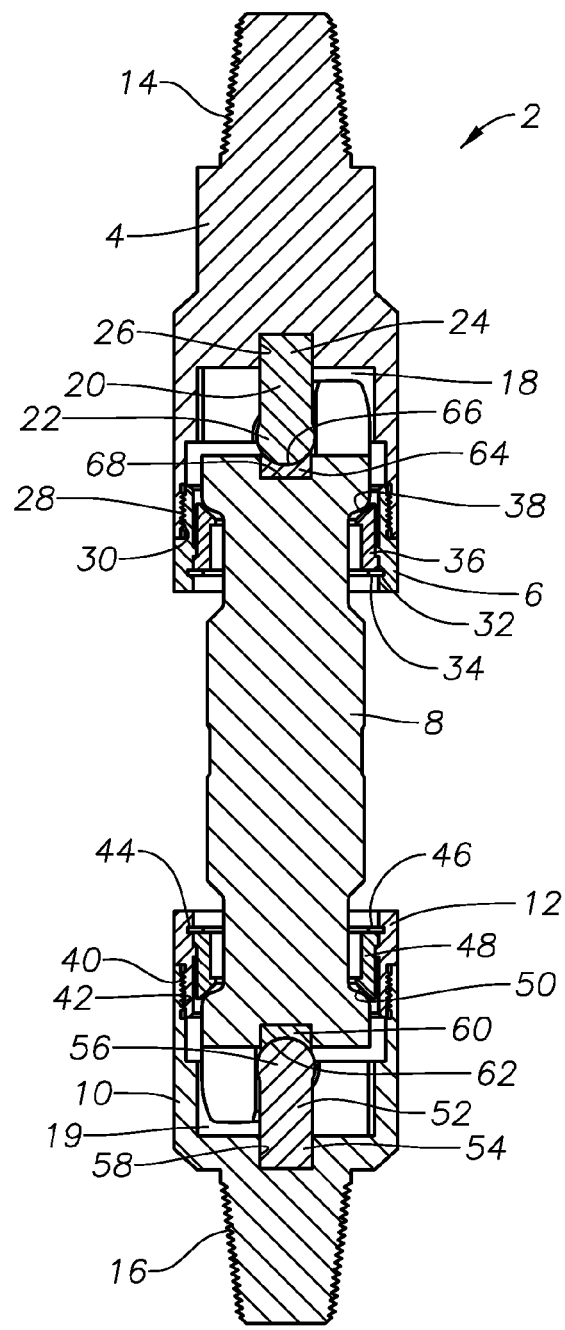
FIG. 1
FIG. 2

CV JOINT FOR DOWN HOLE MOTOR AND METHOD

This application claims priority from U.S. Provisional Patent Application Ser. No. 61/843,985 filed 9 Jul. 2013 and entitled Drive Shaft Lobe Connector, and U.S. Provisional Patent Application Ser. No. 61/846,665 filed 16 Jul. 2013 and entitled Drive Shaft Coupling Threads.

BACKGROUND OF THE INVENTION

This invention relates to down hole motors used in drilling oil and gas wells. More particularly, but not by way of limitation, this invention relates to a CV joint for a transmission used with down hole motors.

As the energy industry seeks new reserves, operators are drilling wells that are highly deviated and in many cases horizontal. The wells can be very deep and the speed in which wells are drilled is critical. The drill strings require highly complex designs and must withstand substantial torque, strain and weight, as well understood by those of ordinary skill in the art.

Prior art down hole motors require a constant velocity ("CV") joint (sometimes referred to as universal joints) for the rotary transmission to the attached drill bit. See U.S. Pat. No. 4,772,246 to Wenzel, entitled "Downhole Motor Drive Shaft Universal Joint Assembly" which is incorporated in its entirety herein by express reference. In the event of a failure of the CV joint, drilling must be ceased and the entire drill string is pulled from the well for proper maintenance and/or repair.

SUMMARY OF THE INVENTION

In one disclosed embodiment, an apparatus for transmitting torque from a down hole motor in a down hole drilling assembly is disclosed. The down hole motor may have an output and the down hole drilling assembly includes a bearing assembly. The apparatus may comprise a center rod having a distal protuberance having a first prong joined by a material bridge to a second prong and a proximal protuberance having a first prong joined by a material bridge to a second prong, a transmission adapter having a first end connected to the down hole motor, a bearing adapter operatively connected to the center rod, and wherein the transmission adapter is configured to connect to the output of the down hole motor and the bearing adapter is configured to connect to an input of the bearing assembly. The apparatus may also comprise a socket formed within a second end of the transmission adapter and configured to receive the proximal protuberance. The apparatus may also include an adapter cap with internal threads being connected to an external thread means located on the transmission adapter. A cap split ring sub abutting the proximal protuberance and configured to engage the center rod may also be included. In one disclosed embodiment, the proximal protuberance has a female insert therein and the apparatus further comprises a spherical member operatively configured to engage the female insert. The female insert may have a cylindrical member with a convex surface configured to engage the spherical member. In one disclosed embodiment, a second spherical member may be included that is operatively configured to engage a second female insert positioned within the distal protuberance. The material bridge, in one embodiment, may be attached to the center rod face with a mechanical member; in another embodiment, the material bridge may be attached to the center rod face with an adhesive; yet in another embodiment, the material bridge may be formed continuously from the center rod face.

In a second disclosed embodiment, an apparatus for transmitting torque to a down hole motor of a down hole drilling assembly is disclosed. With this embodiment, the apparatus may include a center rod having a distal protuberance and a proximal protuberance, with the proximal protuberance having a female insert therein; a transmission adapter having a first end connected to the down hole motor, wherein the transmission adapter contains an external thread means; a socket profile formed within a second end of the transmission adapter and configured to receive the proximal protuberance; and, an adapter cap with internal thread means threadedly connected to the external thread means of the transmission adapter. In this embodiment, the apparatus may include a cap split sub positioned within the adapter cap and configured to engage the center rod. The distal protuberance may contain a first prong extending from a center rod face and a second prong extending from the center rod face, wherein a prong connector joins the first prong and the second prong. In one disclosed embodiment, the transmission adapter is configured to connect to a rotary output of the down hole motor so that the socket profile is rotated which is transmitted to the center rod. The bearing adapter, in one disclosed embodiment, may be operatively connected to the center rod, and wherein the bearing adapter is configured to connect to an input of a bearing assembly in the down hole drilling assembly. A female insert may be included, and wherein the female insert is positioned within the distal protuberance and is operatively associated with a spherical member.

In another disclosed embodiment, a method of drilling a well with a down hole motor is disclosed. In this embodiment, the method comprises providing an apparatus in the well, wherein the apparatus comprises: a center rod having a distal protuberance comprising dual prongs connected together with a first prong connector and a proximal protuberance comprising dual prongs connected with a second prong connector; a transmission adapter having a first end connected to the down hole motor; a socket formed within a second end of the transmission adapter and configured to receive the proximal protuberance; a bearing adapter operatively connected to the center rod, the bearing adapter having a bearing socket therein; wherein the transmission adapter is configured to connect to an output of the down hole motor and the bearing adapter is configured to connect to an input of a bearing assembly in a down hole assembly. This method includes flowing a drilling fluid through the down hole motor which in turn rotates the output of the down hole motor, wherein the output is connected to the transmission adapter. The method may also include engaging the proximal protuberance of the center rod with the transmission socket in the transmission adapter, engaging the distal protuberance of the center rod with the bearing socket in the bearing adapter, and rotating the center rod, the proximal protuberance and the distal protuberance. The method may include distributing force to the first prong connector of the distal protuberance and to the second prong connector of the proximal protuberance. In one embodiment, the method may also include rotating the bearing assembly operatively associated with the distal protuberance, wherein the bearing assembly is attached to a drill bit so that the drill bit is rotated and the well is drilled.

In still yet another disclosed embodiment, the apparatus includes a universal joint design where the base of the lobes/prongs are partially or completely connected thereby reducing the stress risers at the base of the lobes that in turn increases the load carrying capability of the joint and reduces the likelihood of breakage. When the universal joint comes under a torsional load, the inner most points of the lobe bases become highly stressed.

BRIEF DESCRIPTION OF THE DRAWINGS

FIG. 1 is a front view of an embodiment of the CV joint apparatus.

FIG. 2 is a cross-sectional view of the CV joint apparatus seen in FIG. 1 taken along line A-A.

DETAILED DESCRIPTION OF THE PREFERRED EMBODIMENTS

Figure 3:
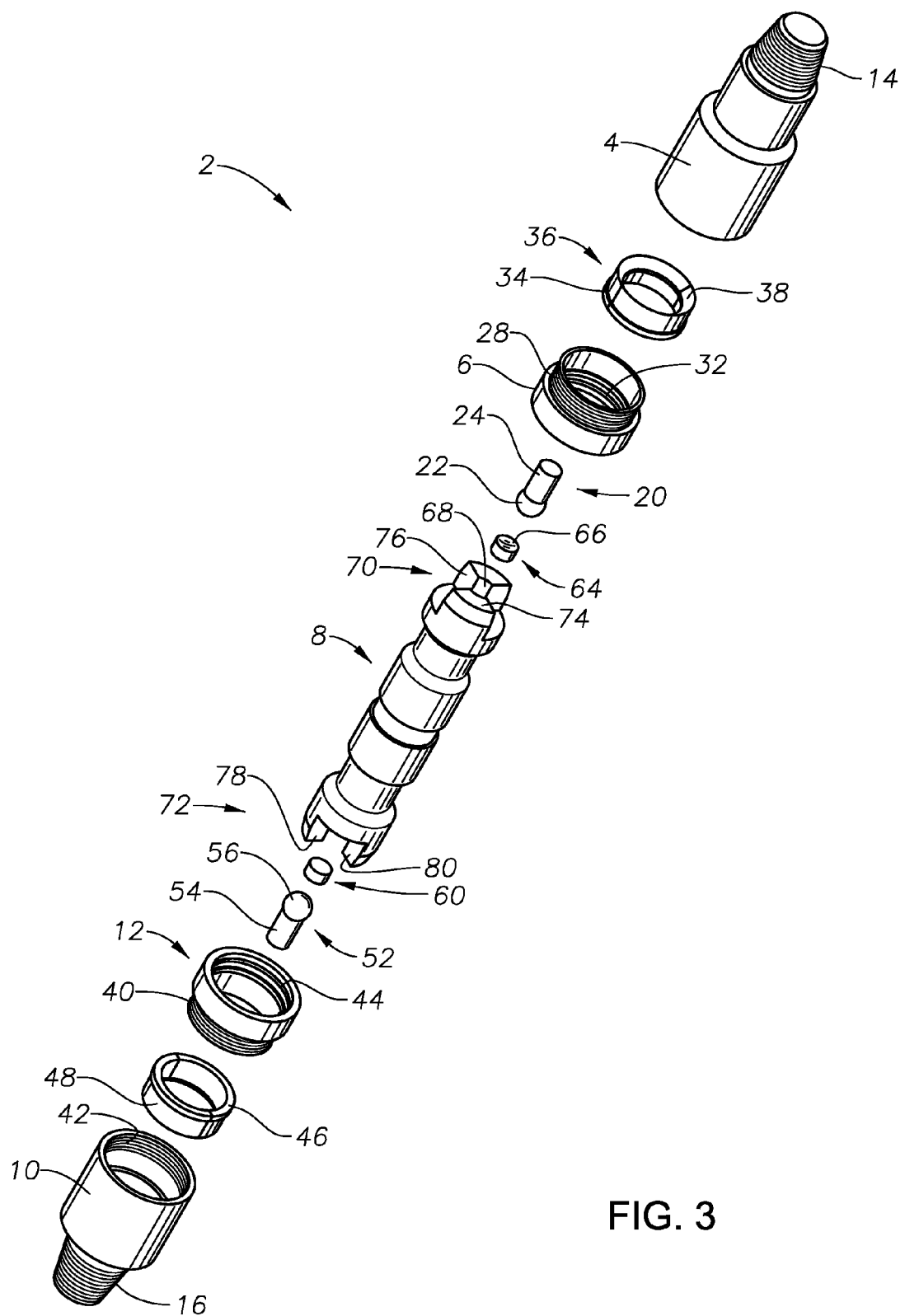
FIG. 3 is an exploded view of the CV joint apparatus seen in FIG. 2.

Referring now to FIG. 1, a front view of one embodiment of the present CV joint apparatus 2 will now be described. The apparatus 2 includes the transmission adapter 4 that is attached to the adapter cap 6, also referred to as the retainer 6. The apparatus 2 includes the center rod 8 that is operatively attached to transmission adapter 4 as will be more fully explained. The center rod 8 is also operatively attached to the bearing adapter 10, wherein the bearing adapter 10 is attached to the adapter cap 12, also referred to as the retainer 12. The bearing adapter 10 is operatively attached to the center rod 8 as will be more fully set-out later in the application. As seen in FIG. 1, the transmission adapter 4 contains thread means 14 for threadedly engaging with the output of a down hole motor (not seen here). Down hole drilling motors are commercially available from Innovative Drilling Motors, LLC under the name drilling motors. The bearing adapter 10 will contain thread means 16 for threadedly engaging with the bearing assembly (not seen here) of a down hole motor.

FIG. 2 is a cross-sectional view of the apparatus 2 seen in FIG. 1 taken along line A-A. It should be noted that like numbers appearing in the various figures refer to like components. The transmission adapter 4 contains a socket profile seen generally at 18 as well as socket profile seen generally at 19 of the bearing adapter 10 that will receive the ends of the center rod 8, which will be described later in the application. FIG. 2 also depicts a male post 20 that contains a first spherical end 22 and a second cylindrical end 24, wherein the cylindrical end 24 is received within bore 26 of the transmission adapter 4.

FIG. 2 also depicts the adapter cap 6 that has an outer portion containing outer thread means 28 that will threadedly engage with inner thread means 30 of the transmission adapter 4. On inner portion of the adapter cap 6, a groove 32 is provided, wherein groove 32 will receive the split ring 34. Split rings are commercially available from Innovative Drilling Motors, LLC under the name split rings. As seen in FIG. 2, the split ring 34 will abut the split ring sub 36 to hold the split ring sub 36 in place. The split ring sub 36 contains a chamfered surface 38 that cooperates and engages with a complementary shoulder of the center rod 8, which will be described later in the application. FIG. 2 also depicts the adapter cap 12 that has an outer portion containing outer thread means 40 that will threadedly engage with inner thread means 42 of the bearing adapter 10. On inner portion of the retainer 12, a groove 44 is provided, wherein groove 44 will receive the split ring 46. As seen in FIG. 2, the split ring 46 will abut the split ring sub 48 to hold the split ring sub 48 in place. The split ring sub 48 contains a chamfered surface 50 that cooperates and engages with a complementary shoulder of the center rod 8, which holds the center rod 8 in an engaged position relative to the bearing adapter 10. In the preferred embodiments, the split ring subs 36, 48 are each separated into two (2) halves (as illustrated in FIG. 3).

FIG. 2 also depicts the male post 52 that contains the cylindrical part 54 that extends to the spherical end 56, with the cylindrical part 54 fitting into an inner bore 58 of the bearing adapter 10. The spherical end 56 engages and cooperates with the female insert 60, with the female insert 60 having a convex surface 62 configured for engagement with the spherical end 56. The spherical end 22 also engages and cooperates with the female insert 64, with the female insert 64 having the convex surface 66 configured for engagement with the spherical end 22.

Referring now to FIG. 3, an exploded view of the CV joint apparatus 2 seen in FIG. 2 will now be described. The transmission adapter 4, with external thread means 14 is shown, along with the split ring sub 36 which is operatively associated with the split ring 34. Also shown is the adapter cap 6 with outer thread means 28 which will engage with internal threads 30 (not seen in this view) of the transmission adapter 4. The split ring sub 36 will cooperate and engage with the adapter cap 6 as previously discussed. FIG. 3 also depicts the male post 20, wherein the spherical end 22 will cooperate and engage the convex surface 66 of the female insert 64.

The female insert 64 is seated within the center rod 8 at 68 as seen in FIGS. 2 and 3. As seen in FIG. 3, the center rod 8 has a first protuberance seen generally at 70 and a second protuberance seen generally at 72. More specifically, the first protuberance 70 has a first prong 74 and a second prong 76; the second protuberance 72 has a first prong 78 and a second prong 80. The prongs 74, 76 will cooperate and engage with the socket 18 formed within the transmission adapter 4 and the prongs 78, 80 will cooperate and engage with the socket 19 formed within the bearing adapter 10 for transmission of the torque. The sockets 18, 19 are cavities that act as the receptacle for the protuberances 70, 72. Hence, the sockets 18, 19 are reciprocally formed relative to the protuberances 70, 72 similar to a tongue and groove arrangement.

As seen in FIG. 3, the bearing adapter 10 has the external thread means 16 for making up with the bearing assembly (not seen in this view). The split ring sub 48 will cooperate and engage with the adapter cap 12, and the adapter cap 12 will threadedly connect via outer threads 40 to the inner threads 42 of the bearing adapter 10. The split ring sub 48 is operatively associated with the split ring 46, wherein the split ring 46 is positioned in the groove 44 of the adapter cap 12, with the split ring 46 abutting the split ring sub 48 to hold the split ring sub 48 in place. FIG. 3 further depicts the male post 52, and wherein the spherical end 56 will engage and cooperate with the convex surface of the female insert 60.

Figure 4:
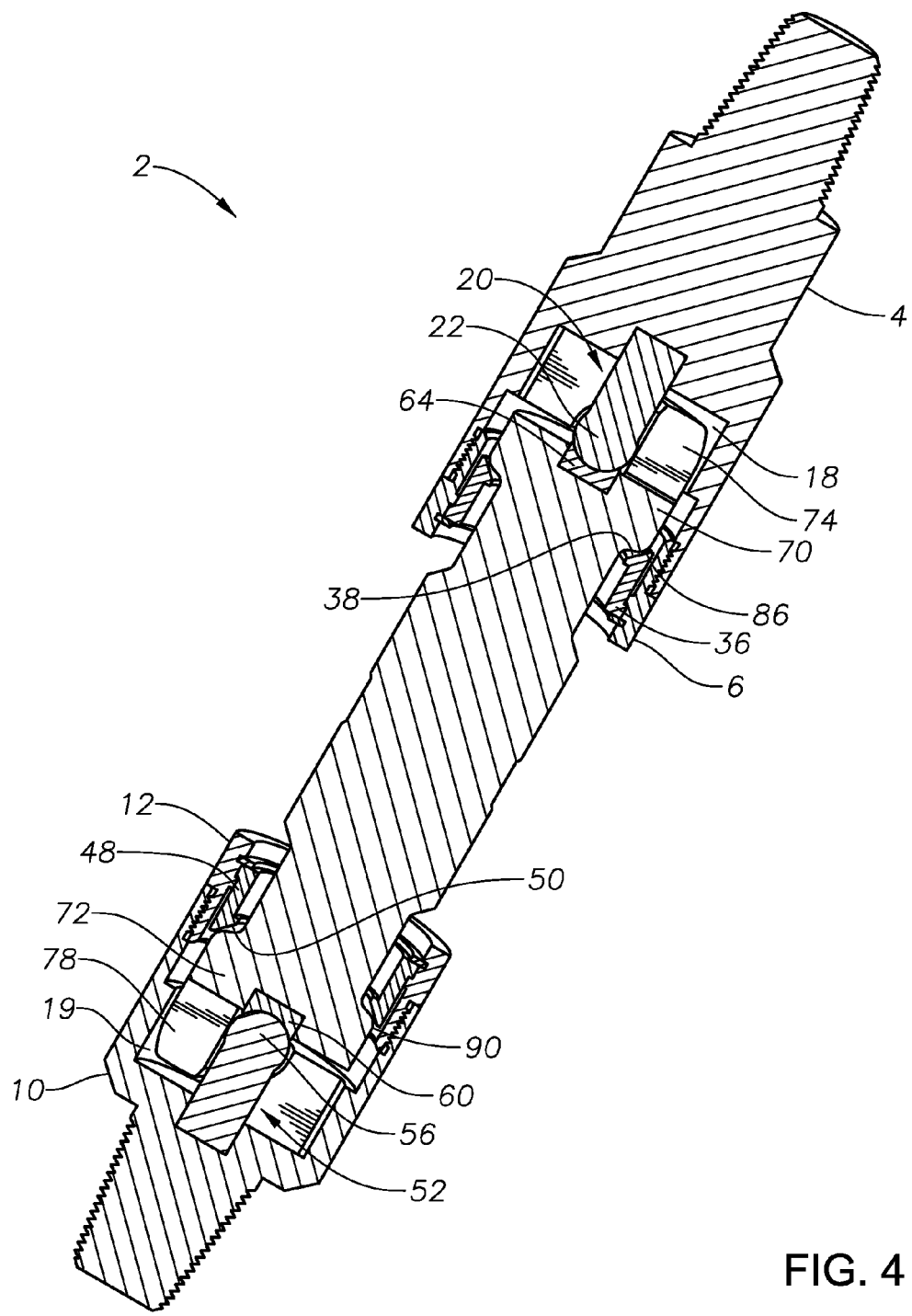
FIG. 4 is an isometric, cross-sectional view of the CV joint apparatus seen in FIG. 1 taken along line A-A.

FIG. 4 is an isometric, cross-sectional view of the CV joint apparatus 2 seen in FIG. 1 taken along line A-A. FIG. 4 depicts the prong 74 of the protuberance 70, wherein the prong 74 is received within the socket 18 of the transmission adapter 4. The socket 18 is a receptacle for the prongs 74, 76 and are configured to receive the prongs 74, 76 as noted earlier. Also, the beveled shoulder 86 of the protuberance 70 cooperates and engages with the chamfered surface 38 of the split ring sub 36. FIG. 4 depicts the prong 78 of the protuberance 72, wherein the prong 78 is received within the socket 19 of the bearing adapter 10. The socket 19 is a receptacle for the prongs 78, 80 and are configured to receive the prongs 78, 80 as noted earlier. Also, the beveled shoulder 90 of the protuberance 72 cooperates and engages with the chamfered surface 50 of the split ring sub 48.

Figure 5:
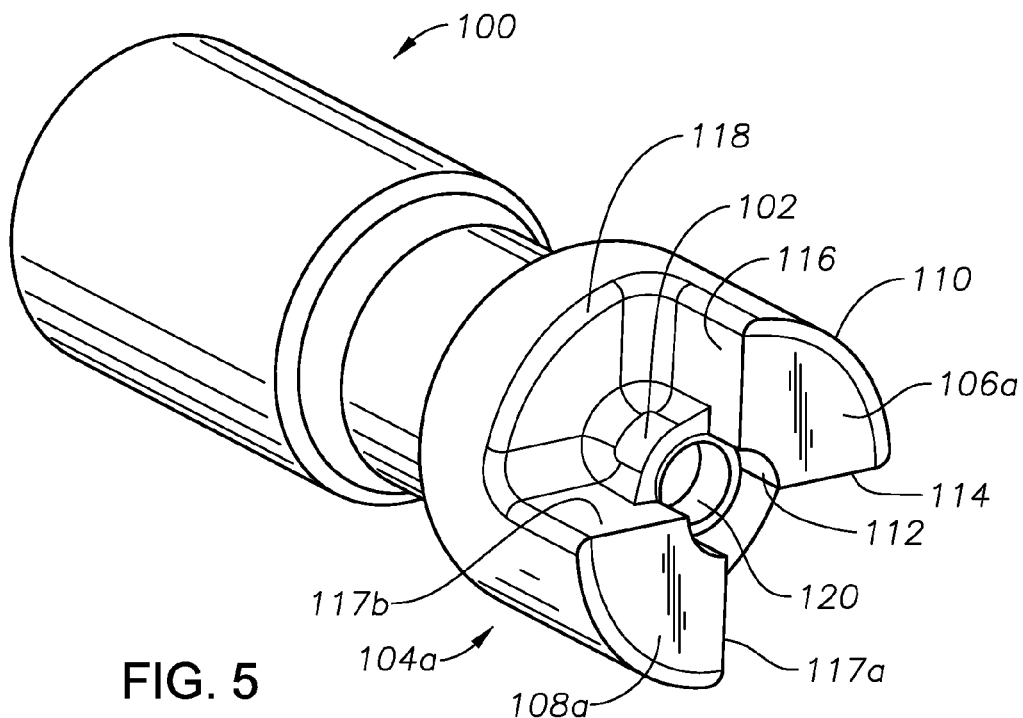
FIG. 5 is an isometric view of a second embodiment depicting a partial center rod with protuberance and the prong connector.

FIG. 5 is an isometric view of a second embodiment depicting a partial center rod 100 with the prong connector seen generally at 102. More specifically, the center rod 100 has a protuberance 104a that extends from the center rod 100, and wherein the protuberance 104a has a first prong 106a and a second prong 108a. The prongs 106a, 108a have an outer curved surface, such as surface 110, and inner curved surface, such as surface 112. The angled surface face 114 and the angled surface face 116 of prong 106a are also shown, and prong 108a will have similar angled surface faces 117a, 117b. FIG. 5 depicts the prong connector 102, which may also be referred to as a material bridge 102, wherein the prong connector 102 is an area of added material that strengthens the protuberances during operation as torque from the down hole motor is being transferred to the bearing assembly, as further described below. The material bridge/prong connector 102 may be affixed to the base portion 118 of the protuberance 104a by means for affixing such as welding the prong connector 102 onto the base portion 118. In the embodiment of FIG. 5, the prong connector 102 is milled from the same stock as the protuberance 104a. Other means of affixing the prong connector 102 to the base portion 118 include initially molding the prong connector 102, using adhesives to attach the prong connector 102 to the base portion 118 or using mechanical means such as nuts, bolts, studs, pins or rivets. FIG. 5 also depicts the recess 120 within the protuberance 104a, wherein the recess 120 will contain a female insert (not shown here).

Figure 6:
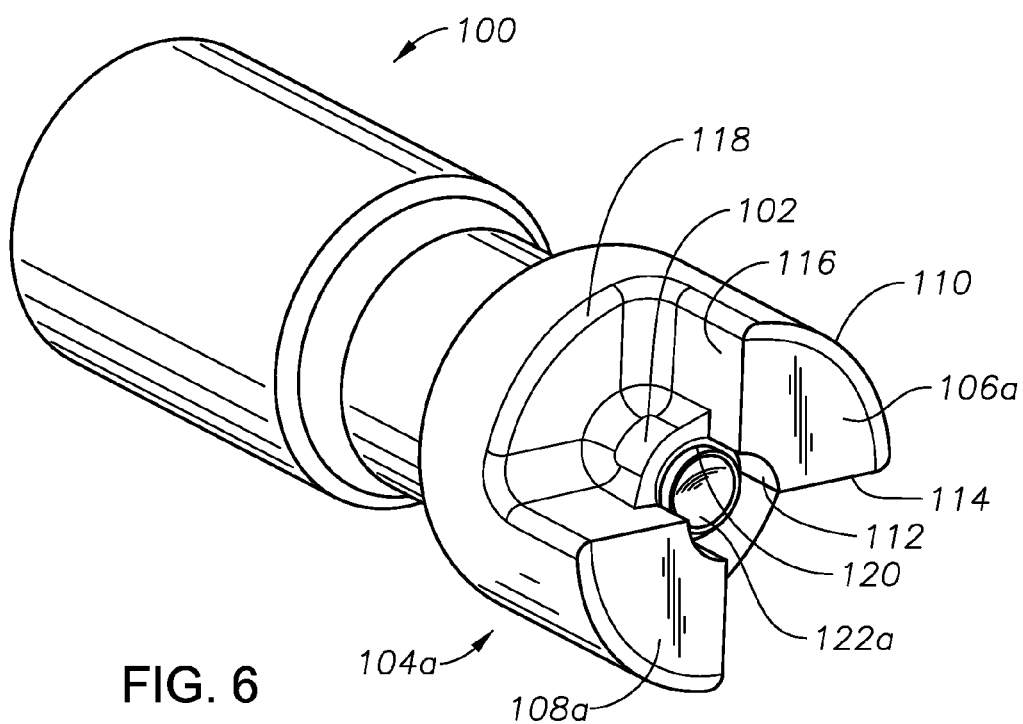
FIG. 6 is an isometric view of the center rod of the second embodiment seen in FIG. 5 with a female insert.

Referring now to FIG. 6, an isometric view of the center rod 100 of the second embodiment seen in FIG. 5 is illustrated with a female insert 122a. More specifically, the protuberance 104a contains the recess 120, and within the recess 120 is the female insert 122a. A spherical member (not shown here) will be operatively associated with the female insert 122a, wherein the female insert 122a is similar to the female inserts previously described wherein the female inserts contain a cylindrical member and a convex surface. In one embodiment, a reciprocal recess with female insert therein may be provided on the transmission adapter and/or bearing adapter. In other words, a female insert may be utilized with both the distal and proximal protuberances.

In the embodiment of FIGS. 5 and 6, the prong connector 102 is a section of load carrying material that is added between the protuberances, and in particular between the prongs. In one embodiment, a first prong connector 102 is provided as well as an opposite side prong connector, i.e. between surfaces 114, 117a (not seen in these views). As previously stated, the material for the prong connector can be machined from the parent material from which the universal joint is machined, can be welded in, can be mechanically fastened to the lobes (i.e. prongs of the protuberances) and/or to the base 118, with any means that facilitates the ability for loading that gets applied to the protuberances to pass through the apparatus. The addition of the load carrying material to the base of the protuberances facilitates the transfer of some of the stress that each lobe encounters to pass between the lobes or from the lobes to the base of the universal joint body. This torque can be from an active source such as a motor and axle, but can also be from a passive application of force.

Figure 7:
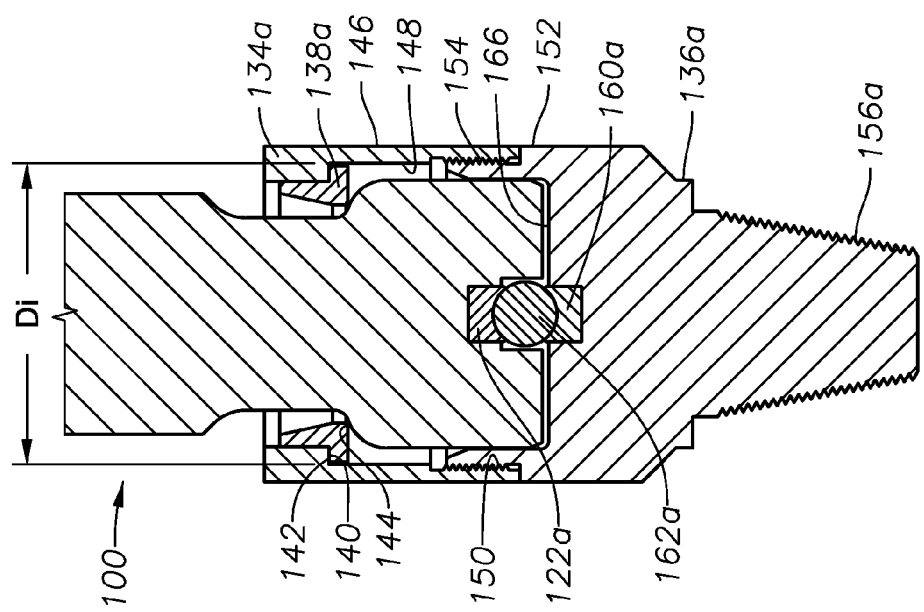
FIG. 7 is a partial, isometric cross-sectional view of a third embodiment depicting the connection between an adapter cap and a transmission adapter.

Referring now to FIG. 7, a partial, isometric cross-sectional view of a third embodiment is illustrated, and more specifically, FIG. 7 depicts the connection between an adapter cap 134a and a transmission adapter 136a. A split sub 138a is disposed within the adapter cap 134a, wherein the split sub 138a is separated into two (2) halves. The split sub 138a has a ledge 140 that engages an internal shoulder 142 of the adapter cap 134a. Also as seen in FIG. 7, the ledge 140 will abut an external rounded shoulder 144 of the center rod 100, and in this way the center rod 100 is engaged with the transmission adapter 136a. The adapter cap 134a has an outer cylindrical surface 146 that extends radially inwards, and on the inner diameter portion 148 there is contained internal thread means 150. FIG. 7 also depicts the transmission adapter 136a having an outer cylindrical surface 152 that extends to the external threads 154, wherein external threads 154 will cooperate and engage with internal threads 150. The transmission adapter 136a will also contain the external thread means 156a, wherein the external thread means 156a will cooperate and engage with complimentary threads from the output of the motor. FIG. 7 also illustrates the female insert 122a placed within the protuberance of the center rod 100 and the female insert 160a placed within the transmission adapter 136a, wherein the inserts 122a, 160a are similar to the previously described female inserts and cooperate and engage the spherical member (i.e. ball) 162a which provides the pivot point, as previously described.

Swivels of C.V. joints typically must allow for angular changes, yet transfer torque forces from a power generator output to an operating device input. As those of ordinary skill in the art will appreciate, swivel areas of the C.V. joints generally become weak (and frequently limiting) components in the overall system. In order to strengthen this swiveling section, this disclosure maximizes the size of at least one end of the drive shaft (and particularly the diameter thereof) which helps the C.V. joint withstand torque and stress forces. To achieve maximizing of the area for a drive shaft end, the adapter retaining cap 134a of this embodiment retains a split sub 138a and the drive shaft 100 end and the adapter cap 134a has internal threads 150. By having internal threads 150, the cavity (i.e. socket 166) that contains the end of a drive shaft (i.e. center rod 100) increases in size, thereby allowing for larger drive shaft lobes (i.e. prongs) which, in turn, increase the overall strength of the C.V. joint, according to the teachings of this disclosure. In other words, the inner diameter "Di" of the adapter retaining cap 134a is a larger inner diameter due to placement of the internal threads 150 that cooperate with the external threads 154.

Figure 8:
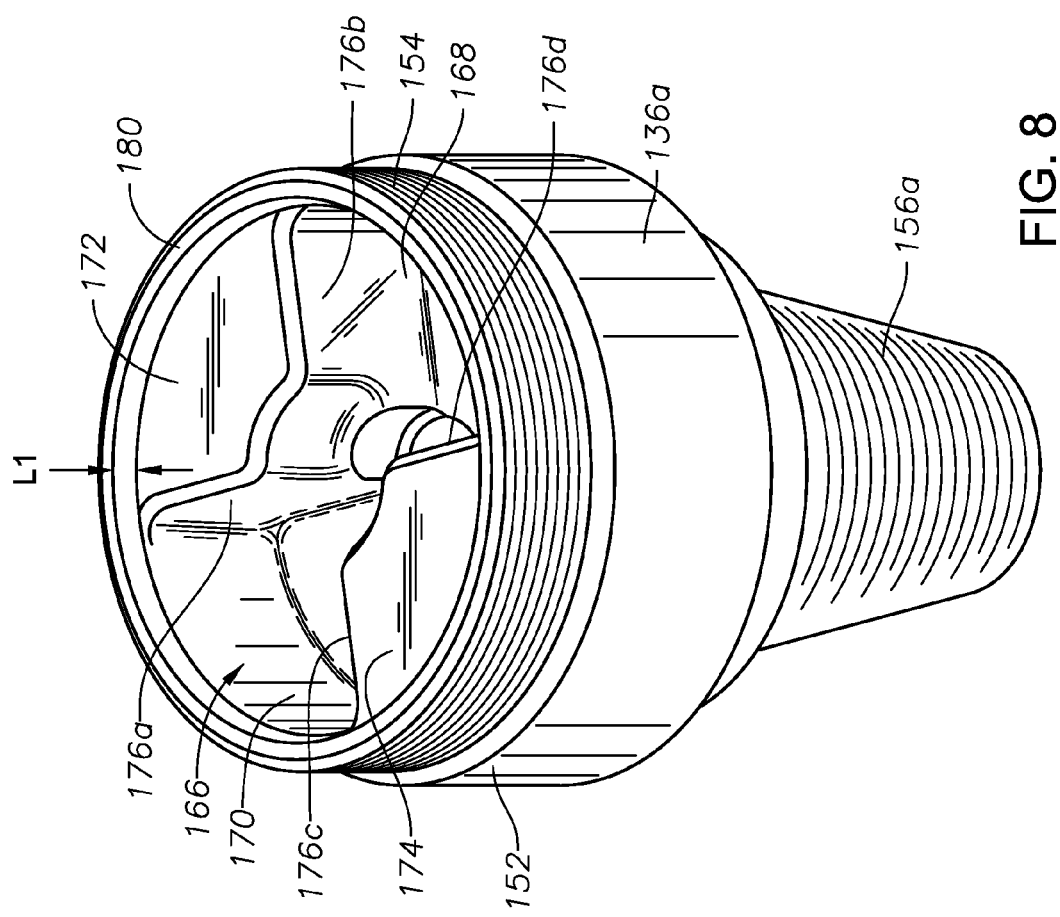
FIG. 8 is an enlarged isometric view depicting the socket of the transmission adapter of the embodiment seen in FIG. 7.

FIG. 8 is an enlarged perspective view depicting the socket 166 of the transmission adapter 136a of the embodiment seen in FIG. 7. As mentioned earlier, the socket 166 is reciprocal to the protuberance formed on the end of the center rod 100 such that the prongs 106a, 108a of the protuberance 104a will engage and mate within the reciprocal sockets, such as socket 166. In one preferred embodiment, both the transmission adapter and the bearing adapter contain sockets that mate with the respective protuberances. As seen in FIG. 8, the socket 166 has cavities 168, 170 as well as elevated surfaces 172, 174. FIG. 8 depicts the side face 176a and the side face 176b of the elevated surface 172. It should be noted that the elevated surface 174 will also contain side faces, seen generally at 176c and 176d. The side faces 176a, 176b, 176c, 176d will wear during use since the force of the applied torque is transmitted to the side faces 176a, 176b, 176c, 176d. Wear material may be added to the side faces 176a, 176b, 176c, 176d. With the embodiment of FIG. 8, the distance from the radial rim 180 to the elevated surfaces 172, 174 is denoted by L1. The distance L1 is a minimum and workable distance, which in turn allows for access to the side the faces 176a, 176b, 176c, 176d of the elevated surfaces 172, 174, such as for treating faces 176a, 176b, 176c, 176d. By having this access to the faces 176a, 176b, 176c, 176d, the operator can apply material that will resist wear, and wherein the material may be hardening material, polymeric material or coating material. In other words, the internal thread configuration of the adapter cap 134a also facilitates the application of hard facing and/or other wear reducing material to the contacting faces of protuberances on the coupling side of a C.V. joint. A substantial distance from the top of the coupling opening to the wearing surfaces severely complicates or makes the application of wear reducing material on these protuberances impossible. This disclosed embodiment of FIG. 8 facilitates the application of wear resistant material to the wearing surfaces in the coupling as well as adding strength as previously noted.

Figure 9:
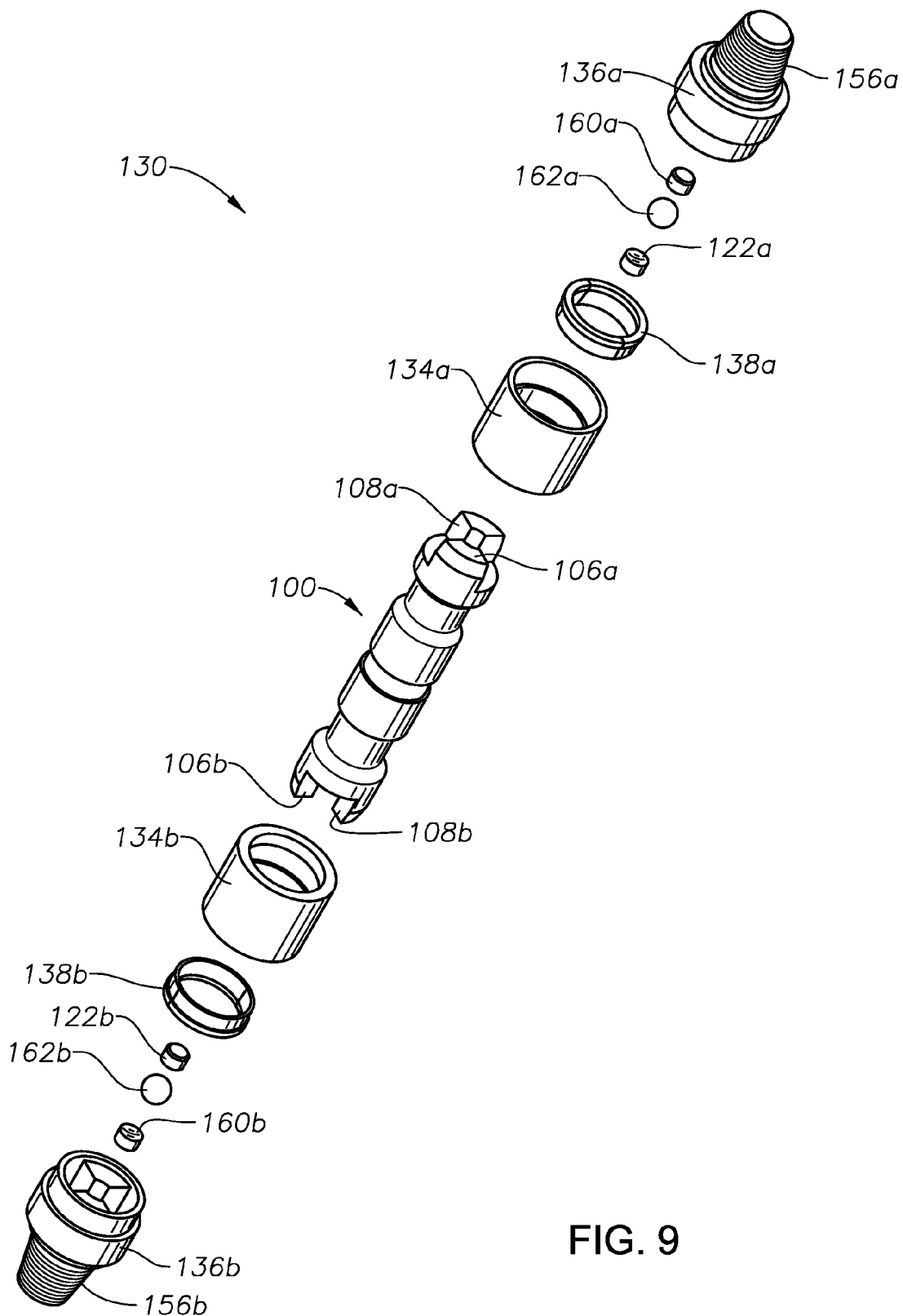
FIG. 9 is an exploded, isometric view of the apparatus including the embodiments seen in FIG. 5 and FIG. 7.

FIG. 9 is an exploded view of the apparatus 130 that contains the second and third embodiments (namely, the embodiments shown in FIGS. 5, 6, 7 and 8). FIG. 9 depicts the center rod 100 coupled to the transmission adapter 136a, and wherein the transmission adapter 136a will be threadedly attached to the output of the motor (not shown here) via threads 156a. Because swivels typically must be flexible to allow for angular changes, yet transfer torque forces from a power generator (motor) output to a device input (such as an axle or drill bit), the swivel area generally becomes weak and limiting component in the overall system. When a swivel joint comprises alternately engaging protuberances, a central pivot point is commonly employed. FIG. 9 depicts the female insert 122a within the recess 120 (not shown here) along with the spherical member 162a which in turn will abut and cooperate with a female insert 160a within transmission adapter 136a. Hence, a pivot point is provided that allows for angular deflection of the apparatus during operational rotation by the mud motor. FIG. 9 also depicts the prongs 106a, 108a (the prong connector 102 not shown in this view). On the opposite end of center rod 100, FIG. 9 illustrates the bearing adapter 136b, and wherein the bearing adapter 136b will be threadedly attached to the bearing assembly (not shown here) via threads 156b. FIG. 9 depicts the female insert 160b associated with the recess (not shown here) along with the spherical member 162b which in turn will abut and cooperate with the female insert 122b associated with the protuberance 104b. FIG. 9 also depicts the prongs 106b, 108b that will fit into the socket 167 of the bearing adapter 136b. The prong connector is not shown in this view. FIG. 9 also illustrates the split sub 138b that is operatively associated with the adapter cap 134b.

Figure 10:
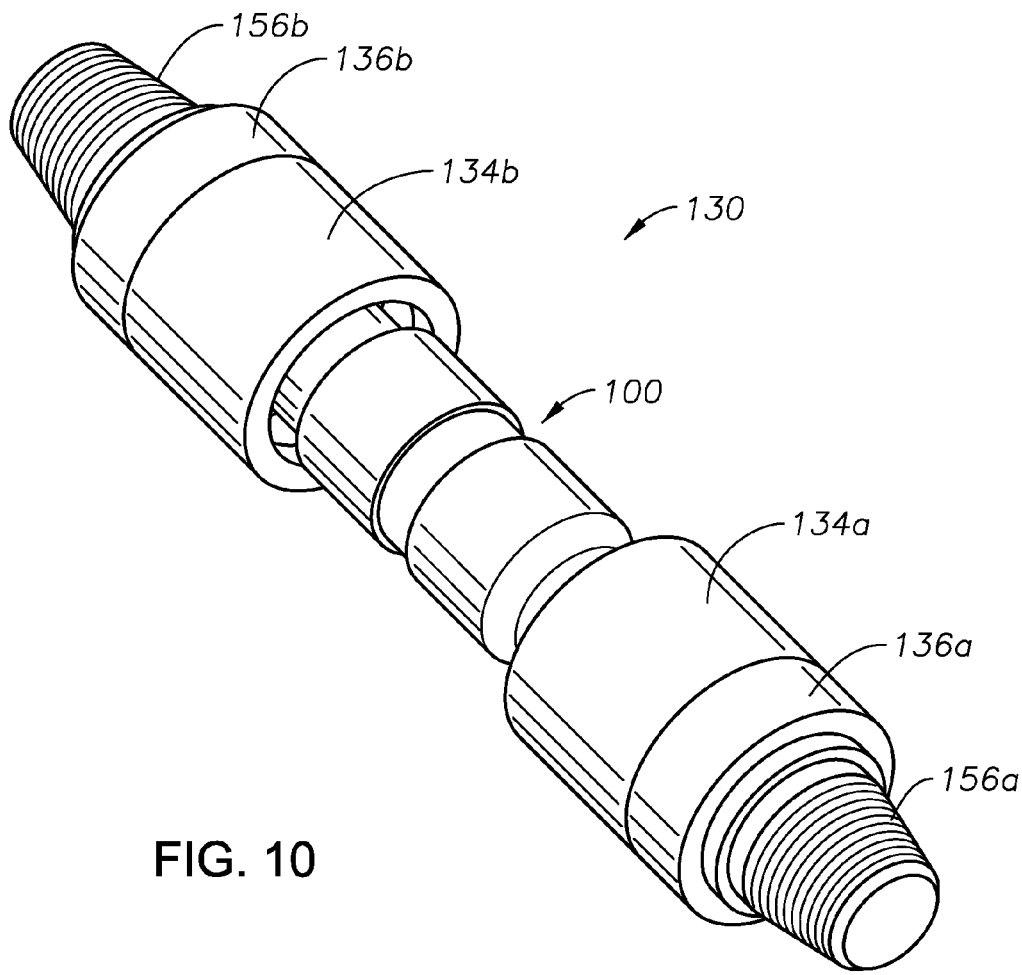
FIG. 10 is an isometric view of the apparatus seen in FIG. 9.

FIG. 10 is an isometric view of the apparatus 130 seen in FIG. 9. As illustrated, the center rod 100 is operatively associated with the transmission adapter 136a and the adapter cap 134a. The threads 156a will connect to the transmission of the motor. Also, on the opposite end, the center rod 100 is operatively associated with the bearing adapter 136b and the adapter cap 134b. The threads 156b will connect to the bearing assembly of the drilling assembly.

Figure 11A:
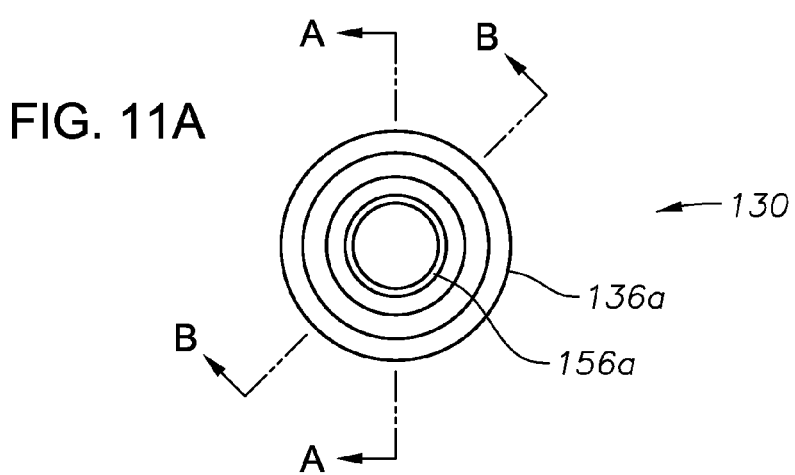
FIG. 11A is a front view of the apparatus seen in FIG. 9.
Figure 11B:
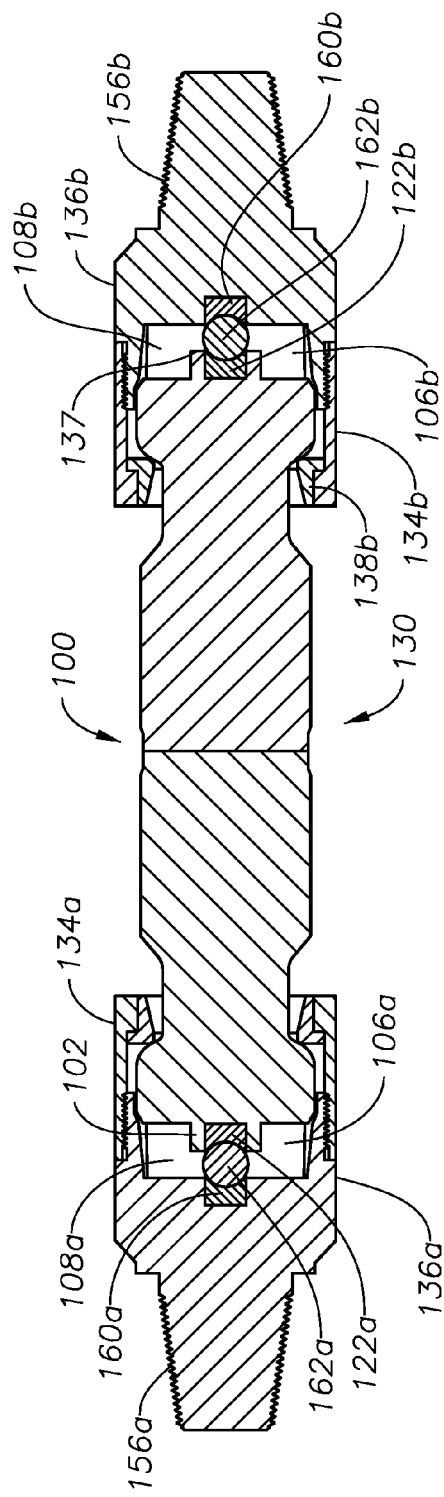
FIG. 11B is a cross-sectional view of the apparatus seen in FIG. 11A taken along line A-A.
Figure 11C:
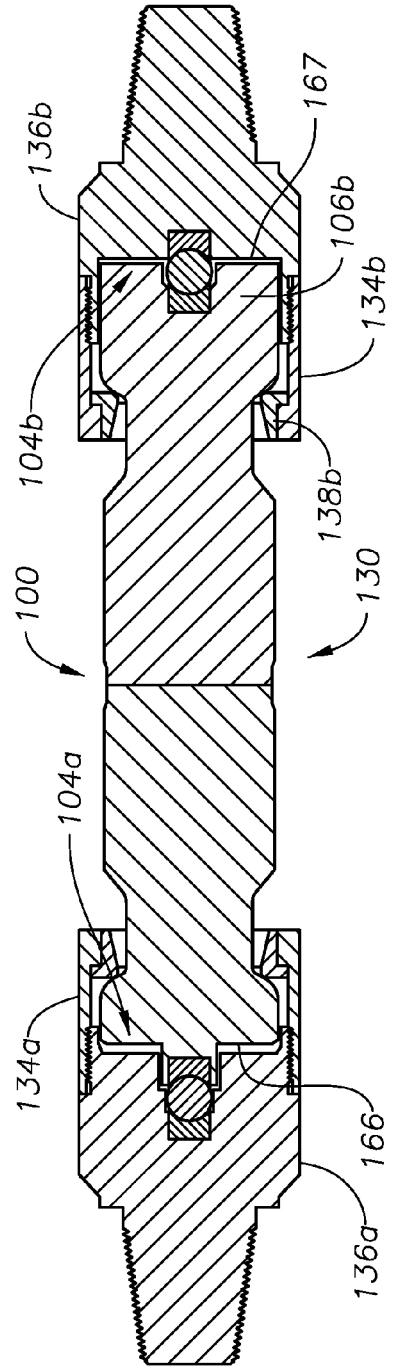
FIG. 11C is a cross-sectional view of the apparatus seen in FIG. 11A taken along line B-B.

Referring now to FIG. 11A, an end view of the apparatus 130 seen in FIG. 10 is illustrated. Hence, the end view shows the outer portion of the transmission adapter 136a as well as the thread means 156a. FIG. 11B depicts a cross-sectional view of the apparatus 130 seen in FIGS. 10 and 11A taken along line A-A of FIG. 11A. As previously noted, the center rod 100 is operatively associated with the transmission adapter 136a and the adapter cap 134a. FIG. 11B depicts the female inserts 122a, 160a operatively associated with the spherical member 162a. Also, FIG. 11B depicts the opposite end of the center rod 100 being operatively associated with the bearing adapter 136b and the adapter cap 134b, as well as the female inserts 122b, 160b being engaged with the spherical member 162b. The prongs 106a, 108a of the protuberance 104a and the prongs 106b, 108b of the protuberance 104b are illustrated. The prong connector 102 is depicted on one end of the center rod 100 and the prong connector 137 on the other end of the center rod 100 is shown. FIG. 11C is a cross-sectional view of the apparatus 130 seen in FIG. 10 taken along line B-B of FIG. 11A. FIG. 11C depicts the protuberances 104a, 104b, as well as the fit of the prongs into the socket 166 and the socket 167 on the opposite end of the apparatus 130 as shown.

Figure 12A:
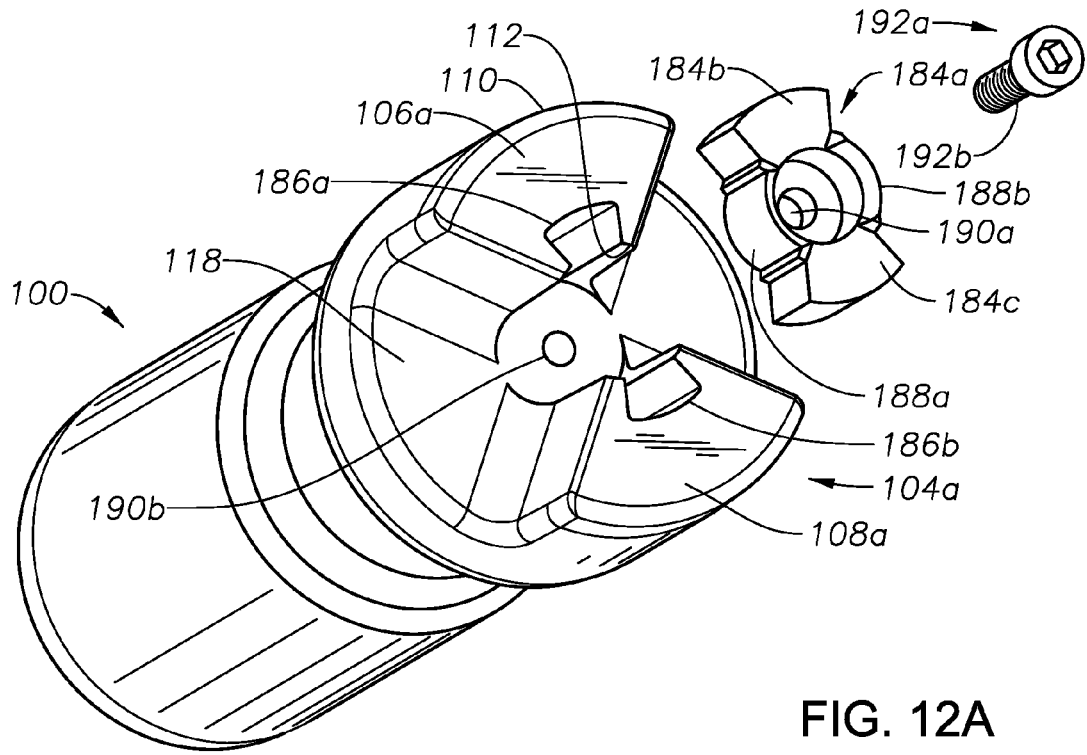
FIG. 12A is a partial, isometric view of an embodiment depicting the protuberance of the center rod with a member for mechanically fastening the prong connector to the center rod.

Referring now to FIG. 12A, a partial, isometric view of an embodiment depicting the protuberance 104a of the center rod 100 with a wing member 184a for mechanically fastening the prong connector to the center rod 100, and in particular, to the base portion 118 is illustrated. As seen in FIG. 12A, the wing member 184a has a first wing 184b and a second wing 184c, and wherein the first wing 184b will cooperate and fit into the key slot 186a formed in the prong 106a and the second wing 184c will cooperate and fit into the key slot 186b formed in the prong 108a, and wherein the wings will fit into the slots in a tongue in groove relationship. The wing member 184a also contains the material bridge, wherein in the embodiment of FIG. 12A the material bridge 188a and the material bridge 188b are included; wherein the material bridge 188a connects the wing 184b with the wing 184c and the material bridge 188b connects the wing 184b with the wing 184c on the opposite side. FIG. 12A further depicts the opening 190a in the wing member 184a as well as the opening 190b in the center rod 100. A screw member 192a is shown, and wherein the shaft threads 192b will cooperate with the opening 190a and opening 190b in order to fasten the wing member 184a to the center rod 100.

Figure 12B:
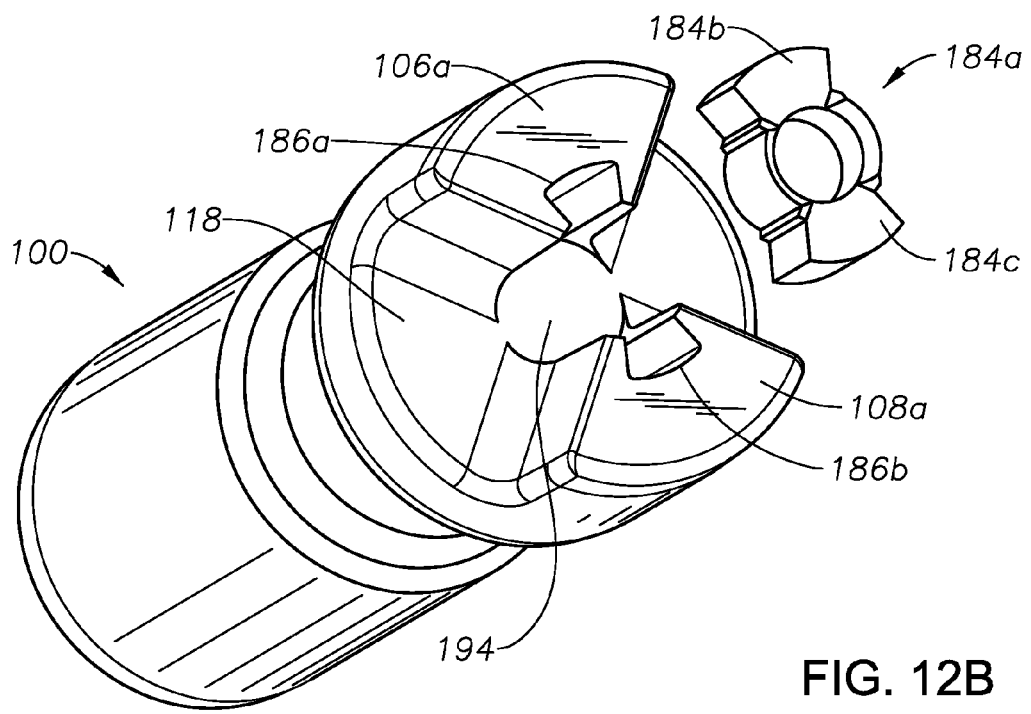
FIG. 12B is a partial, isometric view of another embodiment depicting the protuberance of the center rod with a member for adhesively applying the prong connector to the center rod.

FIG. 12B is a partial, isometric view of another embodiment depicting the protuberance 104a of the center rod 100 with the wing member 184a for adhesively applying the prong connector to the base portion 118. The wing member 184a will be positioned within the key slots 186a/186b as previously noted in the description of FIG. 12A and is similar in that regard. In the embodiment of FIG. 12B, the wing member 184a does not contain a reciprocal opening, and the center rod 100 also does not contain an opening. The area denoted by the number 194 is the area where an adhesive, such as glue, can be applied, and wherein the wing member 184a can be fastened to the center rod 100 by the application of an adhesive.

Figure 13:
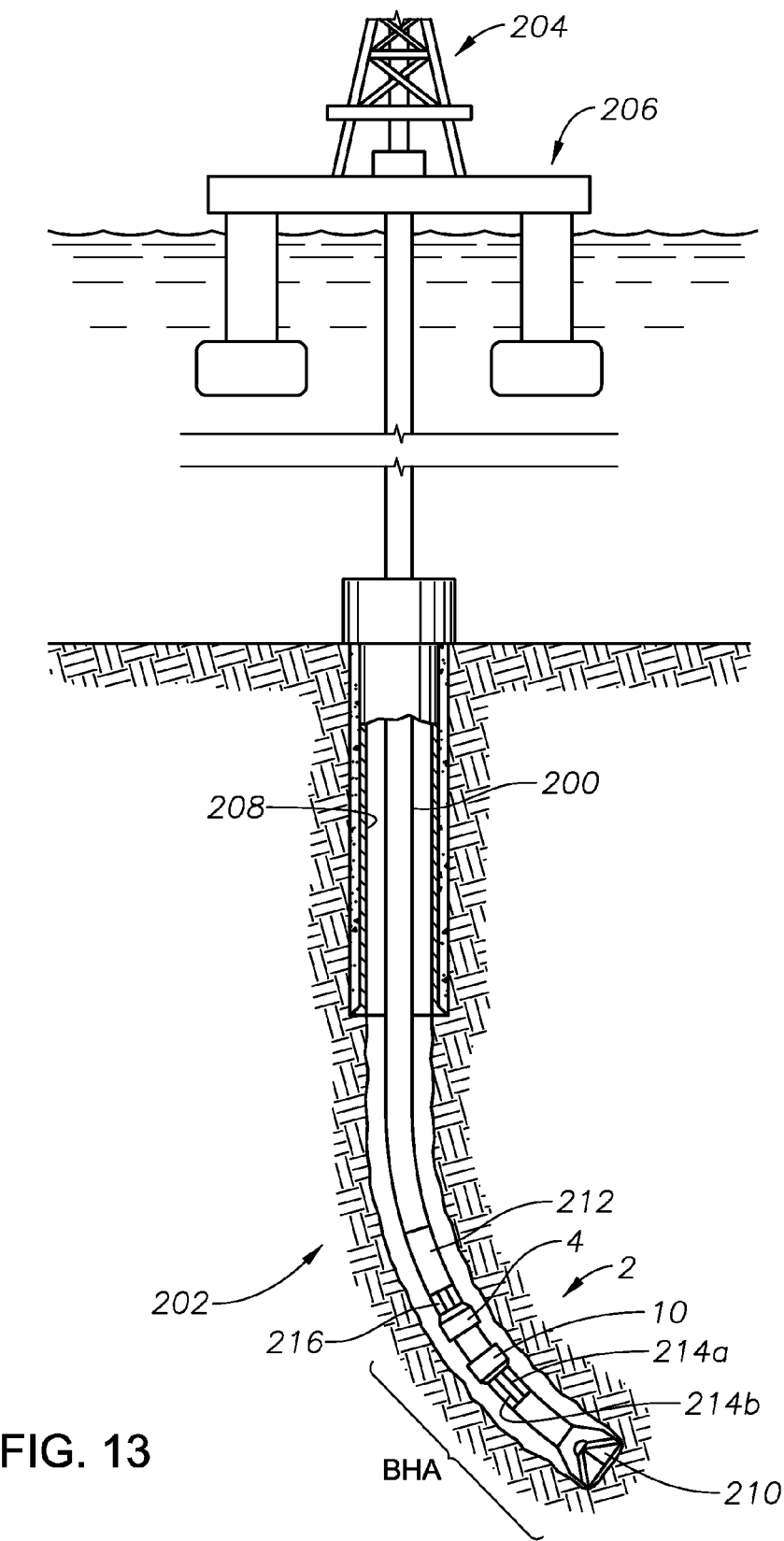
FIG. 13 is a schematic view of the CV joint apparatus used in a drill string for drilling a well.

Referring now to FIG. 13, a schematic view of the CV joint apparatus 2 used in the drill string 200 for drilling a well 202. The schematic shows a drilling rig 204 on a floating platform 206 in offshore waters. A string of casing 208 has been set and the well continues to be drilled with the bit 210. The bit 210 is operatively attached to a bottom hole drill assembly (BHA) that includes a down hole motor 212, the apparatus 2, and the bearing assembly 214a. FIG. 13 depicts the transmission adapter 4 connected to the output 216 of the down hole motor 212, the bearing adapter 10 being connected to the bearing assembly 214a, and the bit 210 drilling ahead.

In operation of one disclosed embodiment, and referring collectively to the figures, the operator provides the apparatus 2 within the well 202 via the drill string 200. A drilling fluid is pumped through the down hole motor 212 which will cause an output shaft 216 to rotate. In one embodiment, this will engage the male post with the proximal protuberance 70. The center rod 8 is rotated via the proximal protuberance 70 being rotated via the socket 18 within the transmission adapter 4, which in turn engages the distal protuberance 72 with the socket 19, which in turn will rotate the bearing adapter 10. This in turn causes the rotation of the center shaft 214b of the bearing assembly 214a and the well 202 is drilled by the bit 210.

An aspect of this embodiment is that prior art ball bearings and ball seats are not utilized. Ball bearings can wear out ball seats, and ball bearings may fail due to fatigue, loads and/or strain. An aspect of this invention is that in the event that one of the protuberance fails, the adjacent protuberance located on the center rod will be able to transfer the transmitted torque so that the bit continues to drill the well.

Another aspect of one of the disclosed embodiments is that by connecting the bases of the protuberances (i.e. prongs), the stresses are distributed thereby reducing joint failure and increasing load carrying ability of a joint. Another aspect of one of the disclosed embodiments is that the prong connector may be machined out of a piece of material continuous with the protuberances, wherein such continuity allows for an uninterrupted path for stresses to flow through the part, which in turn gives maximum benefit for the prong connector to assist the protuberances ability to carry a load.

Yet another aspect of one of the disclosed embodiments is the threading interface between a transmission coupling and an adapter retaining cap attached to the transmission coupling. By using internal threads on the adapter retaining cap, more internal area in the C.V. joint is provided, which allows for use of a larger drive shaft end diameter, which in turn, increases the overall transmission strength of the device. Also, the thread orientation of this disclosed embodiment allows for the coupling to be shortened in order to permit application of wear resistant material to internal lobes (i.e. prongs) of the apparatus, which increases the life of the power transmission joint by reducing internal wear.

Although the present invention has been described in considerable detail with reference to certain preferred versions thereof, other versions are possible. Therefore, the spirit and scope of the appended claims should not be limited to the description of the preferred versions contained herein.

I claim:

1. An apparatus for transmitting torque to a down hole motor in a down hole drilling assembly, wherein the down hole motor having an output and the down hole drilling assembly includes a bearing assembly having an input, the apparatus comprising:
    a center rod having a distal protuberance section and a proximal protuberance section positioned at opposite ends of the center rod, wherein the distal protuberance section and the proximal protuberance section each includes a base portion and first and second prongs spaced opposite each other and extending axially from the base portion and terminating at an end surface, wherein each of the first and second prongs includes an outer curved surface, an inner curved surface, and two angled surface faces interconnecting the outer and inner curved surfaces, wherein the distal protuberance section and the proximal protuberance section each further includes a material bridge portion extending axially from the base portion and terminating below the end surface of the first and second prongs, each material bridge portion including a recess for accommodating a female insert, wherein each material bridge portion strengthens either the distal protuberance section or the proximal protuberance section during operation as torque is transferred to the bearing assembly;
    a transmission adapter having a first end configured to connect to the output of the down hole motor and a second end including a transmission socket profile configured to receive the first and second prongs of the proximal protuberance section, wherein the first prong of the proximal protuberance section is disposed within and directly engages a first cavity of the transmission socket profile and the second prong of the proximal protuberance section is disposed within and directly engages a second cavity of the transmission socket profile for direct transmission of torque between the center rod and the transmission adapter;
    a bearing adapter having a first end operatively connected to the center rod and a second end configured to connect to the input of the bearing assembly.

2. The apparatus of claim 1 further comprising:
    an adapter cap with internal threads connected to an external thread means located on said transmission adapter, wherein the proximal protuberance section of the center rod is at least partially disposed within the adapter cap.

3. The apparatus of claim 2 further comprising:
    a cap split sub disposed within and engaging the adapter cap, said cap split sub abutting said proximal protuberance section of said center rod to secure the first and second prongs of the proximal protuberance section in an engaged position within the first and second cavities of the transmission socket profile.

4. The apparatus of claim 2 wherein the female insert is completely contained within the proximal protuberance section and the apparatus further comprises a spherical member operatively configured to engage said female insert.

5. The apparatus of claim 4 wherein said female insert comprises: a cylindrical member with a convex surface configured to engage said spherical member.

6. The apparatus of claim 5 further comprising a second spherical member operatively configured to engage a second female insert completely contained within said distal protuberance section.

7. The apparatus of claim 5 wherein the material bridge portions are each attached to the base portions of the distal protuberance section and the proximal protuberance section with a mechanical member.

8. The apparatus of claim 5 wherein the material bridge portions are each attached to the base portions of the distal protuberance section and the proximal protuberance section with an adhesive.

9. The apparatus of claim 5 wherein the material bridge portions are each formed continuously with the base portions of the distal protuberance section and the proximal protuberance section.

10. The apparatus of claim 1, wherein the first end of the bearing adapter includes a bearing socket profile configured to receive the first and second prongs of the distal protuberance section, wherein the first prong of the distal protuberance section is disposed within and directly engages a first cavity of the bearing socket profile and the second prong of the distal protuberance section is disposed within and directly engages a second cavity of the bearing socket profile for direct transmission of torque between the center rod and the bearing adapter.

11. An apparatus for transmitting torque to a down hole motor of a down hole drilling assembly, the down hole motor having a rotary output, and the apparatus comprising:
 a center rod having a distal protuberance section and a proximal protuberance section positioned at opposite ends of the center rod, said proximal protuberance section having a base portion, a female insert, and first and second prongs spaced opposite each other and extending axially from the base portion and terminating at an end surface, wherein each of the first and second prongs includes an outer curved surface, an inner curved surface, and two angled surface faces interconnecting the outer and inner curved surfaces, wherein the female insert is completely contained within the proximal protuberance section and includes a cylindrical member with a convex surface;
 a transmission adapter having a first end configured to connect to the rotary output of the down hole motor, wherein said transmission adapter contains an external thread means;
 a transmission socket profile formed within a second end of said transmission adapter, wherein the first and second prongs of the proximal protuberance section are disposed within a first cavity and a second cavity of the transmission socket profile with one of the angled surface faces of each of the first and second prongs contacting a side face of the first and second cavities to solely engage the transmission socket profile with the first and second prongs for direct transmission of torque between the center rod and the transmission adapter;
 an adapter cap with an internal thread means threadedly connected to said external thread means of said transmission adapter, wherein the proximal protuberance section is at least partially disposed within the adapter cap.

12. The apparatus of claim 11 further comprising:
 a cap split sub positioned within said adapter cap and engaging said center rod to secure the first prong of the proximal protuberance section in an engaged position within the first cavity of the transmission socket profile.

13. The apparatus of claim 11 wherein said proximal protuberance section further includes a prong connector extending axially from the base portion and terminating below the end surface of the first and second prongs, wherein the prong connector strengthens the proximal protuberance section during operation as torque is transferred.

14. The apparatus of claim 13 wherein the down hole drilling assembly contains a bearing assembly having an input, and the apparatus further comprises a bearing adapter operatively connected to said center rod, and wherein said bearing adapter is configured to connect to the input of the bearing assembly.

15. The apparatus of claim 14, wherein said distal protuberance section includes a base portion and a first prong and a second prong spaced opposite each other and extending axially from the base portion and terminating at an end surface, wherein each of the first and second prongs includes an outer curved surface, an inner curved surface, and two angled surface faces interconnecting the outer and inner curved surfaces, wherein the distal protuberance section further includes a prong connector extending axially from the base portion and terminating below the end surface of the first and second prongs; wherein the bearing adapter includes a bearing socket profile configured to receive the first and second prongs of the distal protuberance section, wherein the first prong of the distal protuberance section is disposed within a first cavity of the bearing socket profile with one of the angled surface faces of the first prong contacting a side face of the first cavity and the second prong of the distal protuberance section is disposed within a second cavity of the bearing socket profile with one of the angled surface faces of the second prong contacting a side face of the second cavity to solely engage the bearing socket profile with the first and second prongs for direct transmission of torque between the center rod and the bearing adapter.

16. The apparatus of claim 15 further comprising a female insert completely contained within said distal protuberance section operatively associated with a spherical member.

17. The apparatus of claim 16 wherein said female insert within said distal protuberance section comprises: a cylindrical member with a convex surface engaging said spherical member.

18. The apparatus of claim 17 wherein the convex surface of the female insert within said proximal protuberance section engages a second spherical member.

19. The apparatus of claim 13 wherein the prong connector is welded onto the base portion.

20. The apparatus of claim 13 wherein the prong connector is attached to the base portion with a mechanical member.

21. The apparatus of claim 13 wherein the prong connector is attached to the base portion with an adhesive.

22. The apparatus of claim 13 wherein the prong connector is formed continuously from the base portion.

23. A method of drilling a well with a down hole motor comprising:
 a) providing an apparatus in the well, wherein the apparatus comprises: a center rod having a distal protuberance section and a proximal protuberance section positioned at opposite ends of the center rod, wherein the distal protuberance section and the proximal protuberance section each includes a base portion and first and second prongs spaced opposite each other and extending axially from the base portion and terminating at an end surface, wherein each of the first and second prongs includes an outer curved surface, an inner curved surface, and two angled surface faces interconnecting the outer and inner curved surfaces, wherein the distal protuberance section and the proximal protuberance section each further includes a prong connector extending axially from the base portion and terminating below the end surface of the first and second prongs, each prong connector including a recess for accommodating a female insert, a transmission adapter having a first end connected to an output of the down hole motor, a transmission socket profile formed within a second end of the transmission adapter and configured to receive the first and second prongs of the proximal protuberance section, a bearing adapter having a first end with a bearing socket profile configured to receive the first and second prongs of the distal protuberance section, wherein a second end of the bearing adapter is connected to an input of a bearing assembly in a down hole drilling assembly that includes a drill bit, wherein the first and second prongs of the proximal protuberance section are disposed within a first cavity and a second cavity of the transmission socket profile with one of the angled surface faces of each of the first and second prongs contacting a side face of the first and second cavities, and wherein the first and second prongs of the distal protuberance section are disposed within a first cavity and a second cavity of the bearing socket profile with one of the angled surface faces of each of the first and second prongs contacting a side face of the first and second cavities;

b) flowing a drilling fluid through the down hole motor to rotate the output of the down hole motor;

c) rotating the transmission adapter by transmitting torque from the output of the down hole motor to the transmission adapter;

d) rotating the center rod by transmitting torque from the transmission adapter to the center rod, wherein the first and second prongs of the proximal protuberance section solely engage the first and second cavities of the transmission socket profile for direct transmission of torque from the transmission adapter to the center rod, and wherein rotation of the center rod includes distributing torque forces to the prong connector of the proximal protuberance section;

e) rotating the bearing adapter by transmitting torque from the center rod to the bearing adapter, wherein the first and second prongs of the distal protuberance section solely engage the first and second cavities of the bearing socket profile for direct transmission of torque from the center rod to the bearing adapter, and wherein rotation of the bearing adapter includes distributing torque forces to the prong connector of the distal protuberance section;

f) rotating the input of the bearing assembly by transmitting torque from the bearing adapter to the input of the bearing assembly such that the drill bit is rotated and the well is drilled.

* * * * *